US 9,429,349 B2

(12) United States Patent
Meneuvrier et al.

(10) Patent No.: US 9,429,349 B2
(45) Date of Patent: Aug. 30, 2016

(54) DEVICE FOR PRODUCING ARTIFICIAL SNOW, SNOW COVER FACILITY COMPRISING SUCH A DEVICE, AND METHOD FOR THE OPERATION OF SUCH A DEVICE

(71) Applicant: MYNEIGE SAS, Dardilly (FR)

(72) Inventors: Matthieu Meneuvrier, La Roche sur Yon (FR); Eric David, Treillieres (FR); Michel Galvin, Carquefou (FR)

(73) Assignee: TECHNOALPIN FRANCE, Dardilly (FR)

( * ) Notice: Subject to any disclaimer, the term of this patent is extended or adjusted under 35 U.S.C. 154(b) by 0 days.

(21) Appl. No.: 14/427,350

(22) PCT Filed: Sep. 11, 2013

(86) PCT No.: PCT/FR2013/052091
§ 371 (c)(1),
(2) Date: Mar. 11, 2015

(87) PCT Pub. No.: WO2014/041302
PCT Pub. Date: Mar. 20, 2014

(65) Prior Publication Data
US 2015/0241105 A1 Aug. 27, 2015

(30) Foreign Application Priority Data
Sep. 11, 2012 (FR) ...................................... 12 58523

(51) Int. Cl.
*F25C 3/04* (2006.01)
*F16K 3/30* (2006.01)
*F16K 31/12* (2006.01)

(52) U.S. Cl.
CPC . *F25C 3/04* (2013.01); *F16K 3/30* (2013.01); *F16K 31/12* (2013.01); *F25C 2303/0481* (2013.01); *F25C 2600/04* (2013.01)

(58) Field of Classification Search
CPC .............. F25C 3/04; F25C 2303/0481; F25C 2600/04; F16K 3/30; F16K 31/12
See application file for complete search history.

(56) References Cited

U.S. PATENT DOCUMENTS

| 2007/0138313 | A1* | 6/2007 | Corona ................. F16K 31/383 239/2.2 |
| 2012/0175428 | A1* | 7/2012 | Jouneau ................. F16K 11/07 239/2.2 |

FOREIGN PATENT DOCUMENTS

| EP | 1 790 891 A1 | 5/2007 |
| FR | 2 877 076 A1 | 4/2006 |
| FR | 2 950 124 A1 | 3/2011 |
| GB | 1 457 946 A | 12/1976 |
| WO | 02/061516 A1 | 8/2002 |

OTHER PUBLICATIONS

International Search Report, dated Nov. 6, 2013, from corresponding PCT application.

* cited by examiner

*Primary Examiner* — Darren W Gorman
(74) *Attorney, Agent, or Firm* — Young & Thompson

(57) ABSTRACT

A device (100) for producing artificial snow, provided with a body (101) including a pressurized water supply duct (10) and a pressurized air supply duct (20), at least one spray element (130) for spraying water or a mixture of air and water, at least one control valve (140) for adjusting the pressurized water and/or pressurized air supply of the spray element, and operating elements, in the form of at least one camshaft, for operating the control valve (140). The valve (140) is placed on the pressurized water and air supply ducts (10 and 20), and includes, on the periphery thereof, a water chamber (144) for the pressurized water supply thereof and an air chamber (145) for the pressurized air supply thereof. The valve (140) also includes a fixed body (141) in the general shape of a tube defining an inner receiving region (142) wherein a movable body (142) is housed, the body being translatably movable along a translation axis.

18 Claims, 7 Drawing Sheets

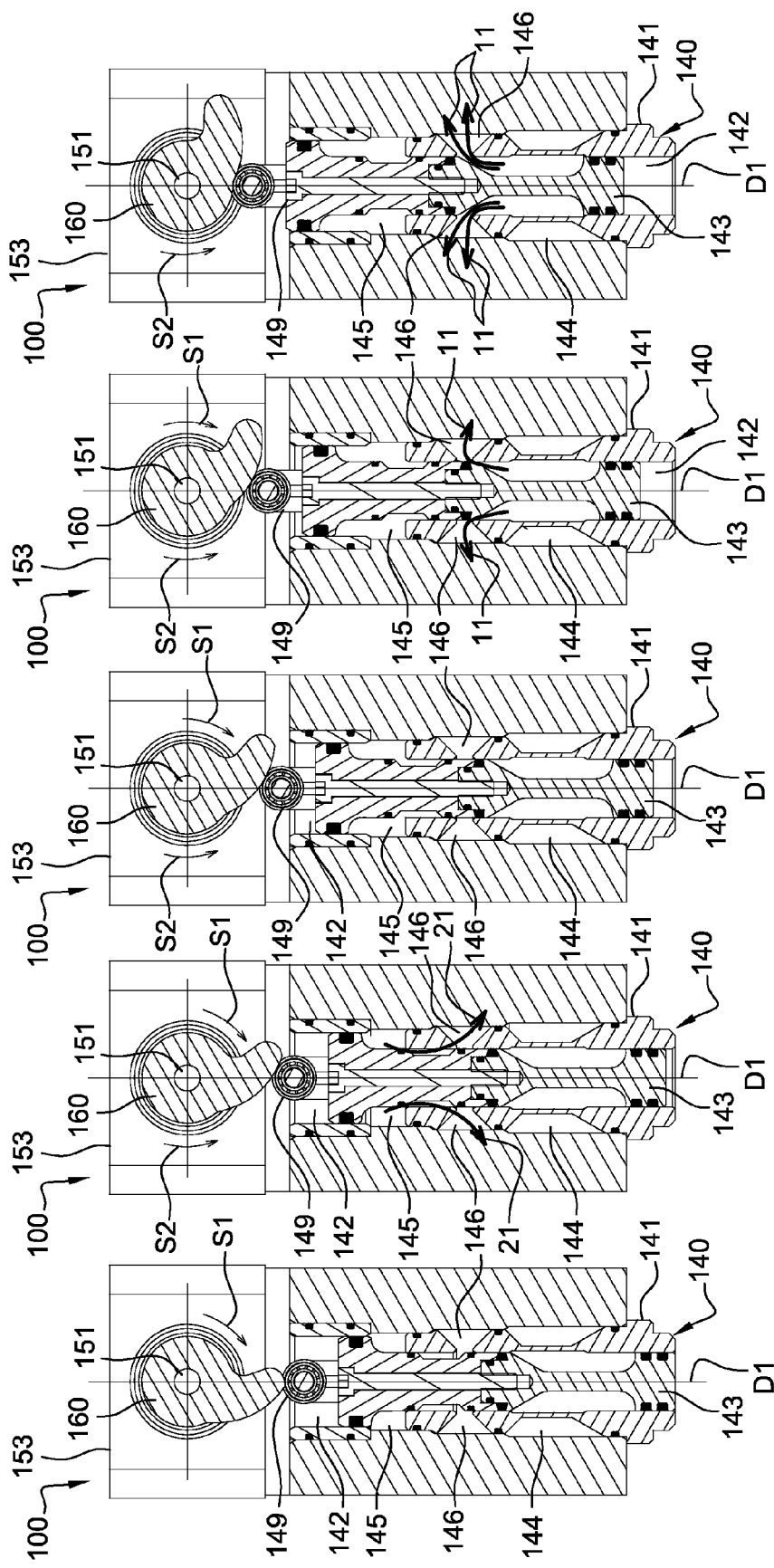

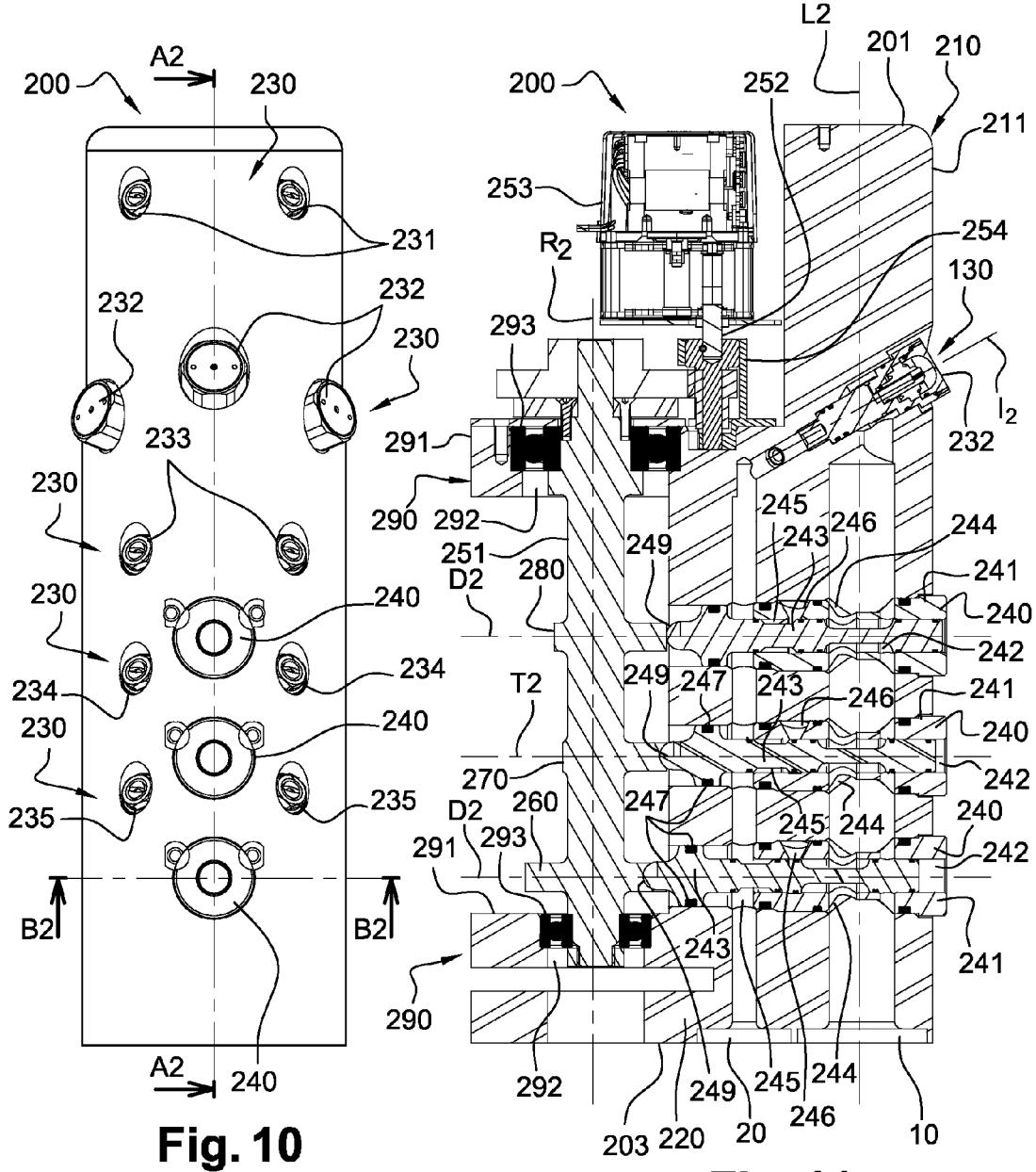
Fig. 10
Fig. 11
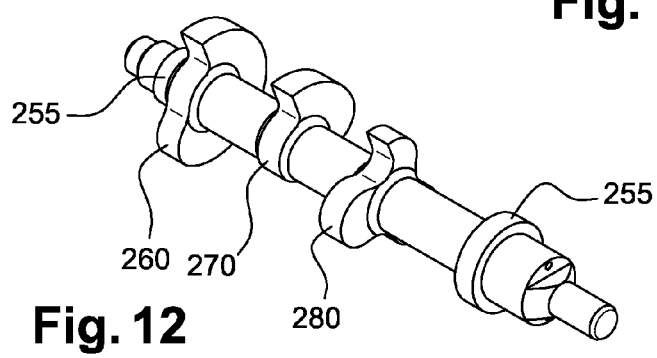
Fig. 12

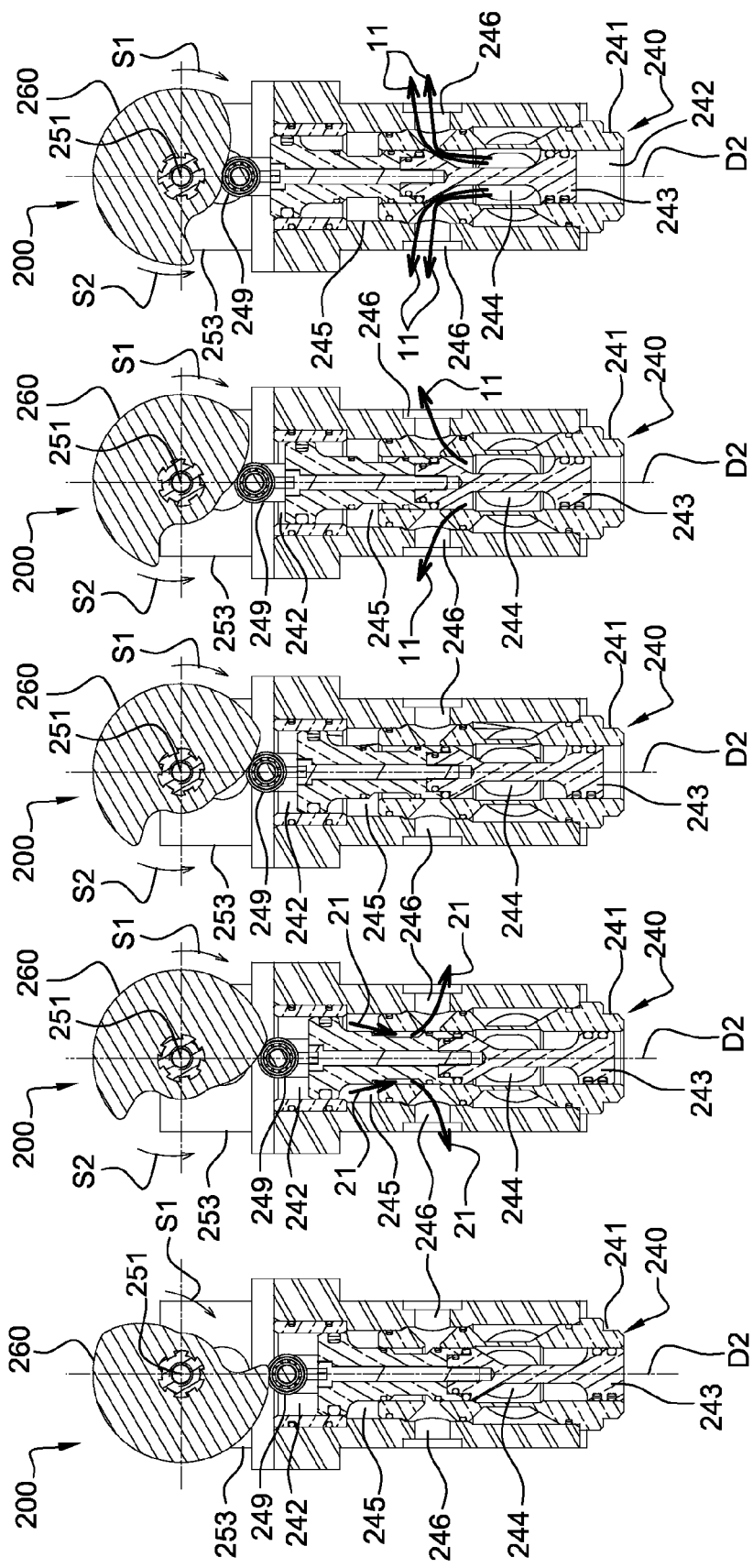

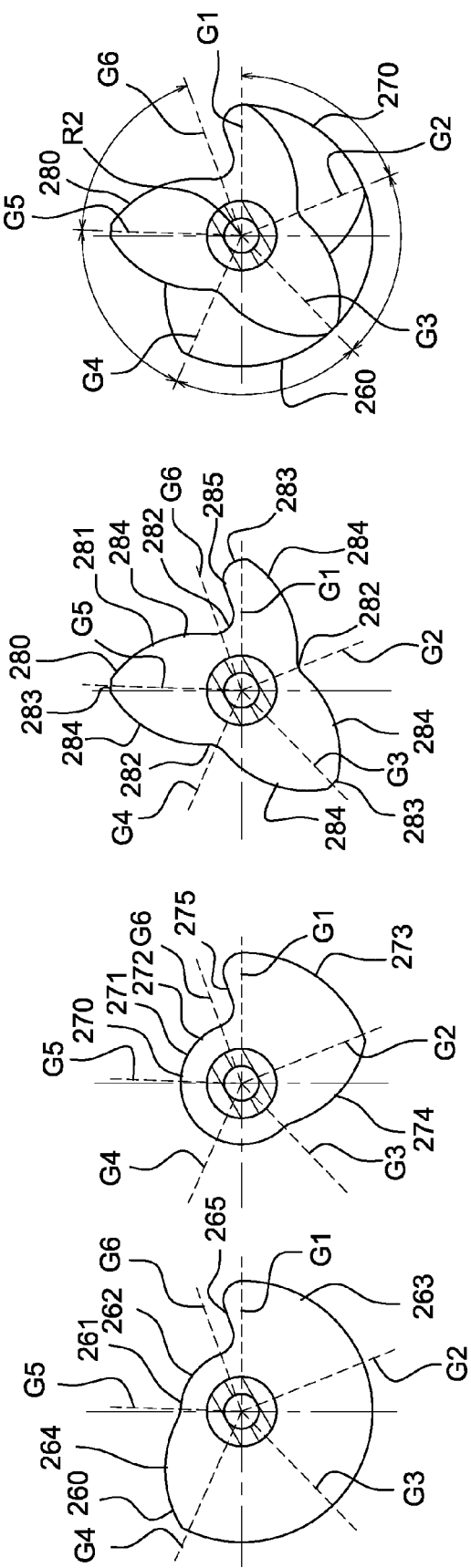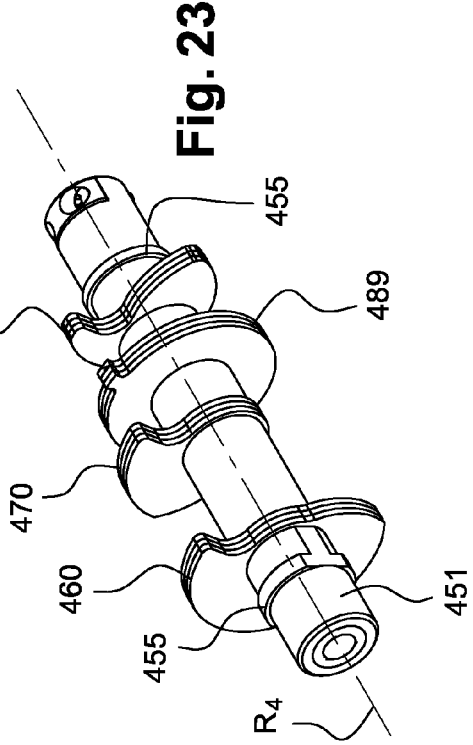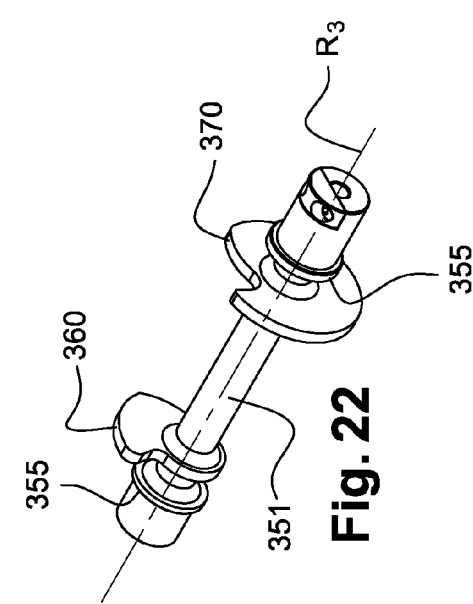
Fig. 18
Fig. 19
Fig. 20
Fig. 21
Fig. 22
Fig. 23

DEVICE FOR PRODUCING ARTIFICIAL SNOW, SNOW COVER FACILITY COMPRISING SUCH A DEVICE, AND METHOD FOR THE OPERATION OF SUCH A DEVICE

TECHNICAL FIELD TO WHICH RELATES THE INVENTION

The present invention generally relates to the making of culture snow, also called artificial snow.

It relates in particular to a culture snow making device, comprising a body including:—a pressurised water supply duct and a pressurised air supply duct,—at least one element for spraying water or a mixture of air and water,—at least one control valve for adjusting the supply of pressurised water and/or pressurised air to said spray element, and— piloting means, in the form of a camshaft, intended to pilot said control valve.

The invention also relates to a snowing machinery comprising this culture snow making device, as well as an operating method of such a device.

TECHNOLOGICAL BACK-GROUND

The ski slopes are arranged to receive in particular natural snow, for example for practicing alpine skiing or cross-country skiing.

Generally, it is known to make culture snow to put it on the ski slopes in order to compensate for lack of natural snow.

In this case, snowmakers supplied via pressurised water ducts and via pressurised air ducts are installed on at least one part of the edges of the ski slopes, to allow the production of such culture snow.

Very generally, such a snowmaker comprises a pole firmly fixed in the ground.

This pole carries pressurised air and pressurised water, via distinct supply ducts, to a snowing head located at its free end, located several meters or even ten meters away.

This snowing head comprises—a plurality of water spray nozzles,—possibly at least one nozzle for spraying a mixture of air and water, forming a nucleation device, and—a plurality of valves that ensure the adjustment of the supply of pressurised water and possibly of pressurised air to these spray nozzles, so as to optimize the quantity of culture snow to be produced as a function of the meteorological conditions.

Snowmakers exist, whose slide valves are arranged at the base the pole. Hence, for such snowmakers, it is necessary to evacuate and/or to heat a great volume of water, stored in particular in the pole and the spray nozzles, so as to avoid a deterioration of the snowmaker by a freezing of the water in presence.

Moreover, it is known from the document FR-2 877 076 a snowmaker whose slide valves are arranged in the snowing head at different levels, and are each piloted by an electromagnetic control means arranged at the rear of these slide valves.

However, this snowing head has for drawback to be complex due to the great number of parts that constitute it, in particular as regards the electromagnetic control means. It also has an heavy weight to which the pole has to resist. Furthermore, such a snowmaker is subject to dysfunctions, then requiring significant and regular preventive and/or curative servicing operations.

Moreover, each electromagnetic control means consumes a significant quantity of electric energy to allow the production of culture snow by the snowing head.

It is also known from the document EP-1 790 891 a device for spraying pressurised water and/or air in order to make culture snow.

This device includes valves for adjusting the fluid flow rate, which are each controlled by a cam carried by a motorised camshaft.

These valves have an elongated structure, one end of which is provided opposite an axial fluid (either water or air) inlet, and the other end of which is controlled by the associated cam, to adjust the delivery of the fluid flow through a lateral outlet.

This type of structure requires the presence of valves each dedicated to the management of a single fluid and proves to be relatively complex.

OBJECT OF THE INVENTION

In order to remedy the above-mentioned drawbacks of the prior art, the present invention proposes a culture snow making device, of simple structure, which is light weight, simple to use, reliable and cheap.

This device further allows a fine adjustment of the stroke of the valve(s) in presence.

More particularly, it is proposed according to the invention a culture snow making device of the type comprising a body including:
- a pressurised water supply duct,
- a pressurised air supply duct,
- at least one element for spraying water or a mixture of air and water,
- at least one control valve for adjusting the supply of pressurised water and/or pressurised air to said spray element, and
- piloting means intended to pilot said control valve, which piloting means include a camshaft driven into rotation about its longitudinal axis by an actuator, said control valve cooperating with a cam carried by said camshaft;

And this device is characterized in that said control valve is placed on said pressurized water supply duct and on said pressurized air supply duct, and includes over a part of its perimeter, at least one water chamber intended to be supplied with pressurized water via said pressurized water supply duct, and at least one air chamber intended to be supplied with pressurized air via said pressurized air supply duct, which control valve comprises a fixed body, generally tubular in shape, delimiting an inner housing in which in accommodated a mobile body, which is translationally mobile along a translation axis extending perpendicular to the longitudinal axis of said camshaft.

Other non-limitative and advantageous characteristics of the device according to the invention are the following:
- the body of the device comprises at least two control valves that are each arranged at different levels of said pressurized air supply duct and said pressurized water supply duct; and these control valves are each piloted by a cam provided on the camshaft of said piloting means.
- the device includes at least one spray element in the form of a nucleation device supplied with pressurized water via said pressurized water supply duct and supplied with pressurized air via said pressurized air supply duct.
- the device includes at least one spay element in the form of a water spray nozzle.

the device includes at least two spray elements, one in the form of a water spray nozzle, and the other in the form of a nucleation device, which nucleation device is arranged downstream of said water spray nozzle, with respect to said pressurized water supply duct, and at least said water spray nozzle being supplied with water or air through a control valve.

at least one of the cams has such a profile that the control valve with which said cam cooperates is mobile between at least two positions: a/ the one allowing the supply of pressurized water and possibly of pressurized air to the associated spray element, and b/ the other inhibiting the supply of pressurized water and possibly of pressurized air to said spray element;

in this case, said spray element advantageously comprises at least one water spray nozzle, said first and second positions allowing and inhibiting respectively the supply of pressurised water to said water spray nozzle; moreover, said cam has advantageously such a profile that said control valve with which it cooperates is mobile up to a third position, different from said first and said positions, allowing the supply of pressurised air to said water spray nozzle;

the profile of at least two cams is such that the control valves associated with the water spray nozzles are adapted, for a same position of the camshaft, to be in positions that are different from each other;

the device includes at least one control valve adapted to allow the water draining of one at least of the water spray nozzles, by pressurised air coming from said pressurised air supply duct.

the body of the snowing head comprises means for returning each control valve towards a position in which a free end of each of said valves, opposite an associated cam, ensures a bearing against said opposite cam; in this case, the return means in question are advantageously formed by the pressurised air circulating in the pressurised air supply duct, for example an air supply of a nucleation device; and the actuator comprises a bidirectional motor that drives said camshaft into rotation, said motor being associated with means for controlling the speed and controlling the position of the camshaft.

The invention also proposes a snowing machinery that comprises a pole, and a device as defined hereinabove, arranged at a free end of this pole.

The invention further proposes an operating method of a device according to the invention or of a snowing machinery according to the invention, the spray element comprising at least one water spray nozzle, in which are implemented the steps of:

a) piloting said camshaft to allow the supply of pressurized water to said water spray nozzle via said associated control valve, b) piloting said camshaft in a first direction of rotation to inhibit the supply of pressurized water to said water spray nozzle, c) piloting said camshaft, still in said first direction of rotation, to allow the supply of pressurized air to said water spray nozzle, so as to ensure the evacuation of the pressurized water from said water spray nozzle, then d) piloting said camshaft, still in the first direction of rotation, to inhibit the supply of pressurised air (and advantageously of pressurised water) to said water spray nozzle.

Advantageously, thanks to this method, the spray nozzle is drained by pressurised air before being closed. Hence, such a spray nozzle contains no water droplets liable to damage or to clog it when this water is transformed into ice.

The invention more particularly proposes an operating method that advantageously comprises the additional step in which, after the succession of steps a), b), c) and d), said camshaft is piloted in a second direction of rotation, opposed to said first direction of rotation, so as to perform successively the steps d), c), b) then a), in order to put the spray nozzle back in operation.

DETAILED DESCRIPTION OF AN EXEMPLARY EMBODIMENT

The following description associated with the appended drawings, given by way of non-limitative examples, will allow to well understand in what consists the invention and how it can be embodied.

In the appended drawings:

FIGS. 5 to 9 are schematic sectional views of the device of FIGS. 1 and 2, according to the plane B1-B1 of FIG. 1, each showing the cam of the camshaft, in different angular positions for the operation of the associated valve, for the purpose of supplying pressurized water and possibly pressurized air to the associated spray nozzles;

FIG. 10 is a schematic view, similar to that of FIG. 1, of a second embodiment of a culture snow making device according to the invention;

FIG. 11 is a schematic sectional view of the device of FIG. 10 according to the plane A2-A2;

FIG. 12 shows the camshaft of the device of FIG. 11, in a schematic and perspective view;

FIGS. 13 to 17 are schematic sectional views of the device of FIG. 10 according to the plane B2-B2, each showing a same cam of the camshaft, in different angular positions, for the operation of the associated valve, for the purpose of supplying pressurized water and possibly pressurized air to the associated spray nozzles;

FIGS. 18 to 20 are schematic sectional views of the camshaft of FIG. 12, showing respectively in profile each of the cams of the camshaft;

FIG. 21 is a schematic sectional view of the camshaft of FIG. 12, showing in profile the superimposed cams;

FIGS. 22 and 23 are schematic views similar to that of FIG. 3 showing a third and a fourth embodiment, respectively, of a camshaft intended to equip a device according to the invention; and FIG. 24 is a schematic sectional view, similar to that of FIG. 11, showing a device according to the invention equipped with the camshaft shown in FIG. 23.

Preliminarily, it will be noted that throughout the figures, the identical or similar elements of the different embodiments of the invention will be, as far as possible, denoted by the same reference signs and will not be described every time.

In FIGS. 1 to 21, two embodiments of a culture snow making device 100; 200 according to the invention are shown.

These culture snow making devices 100; 200, as generally shown in these FIGS. 1 to 21, are particularly adapted to equip a snowing machinery that comprises in particular a pole (not shown).

In the case of such a snowing machinery, the pole being fixed at one end in the ground, it comprises a free end in height, on which is arranged the culture snow making device 100; 200.

Figure 2:
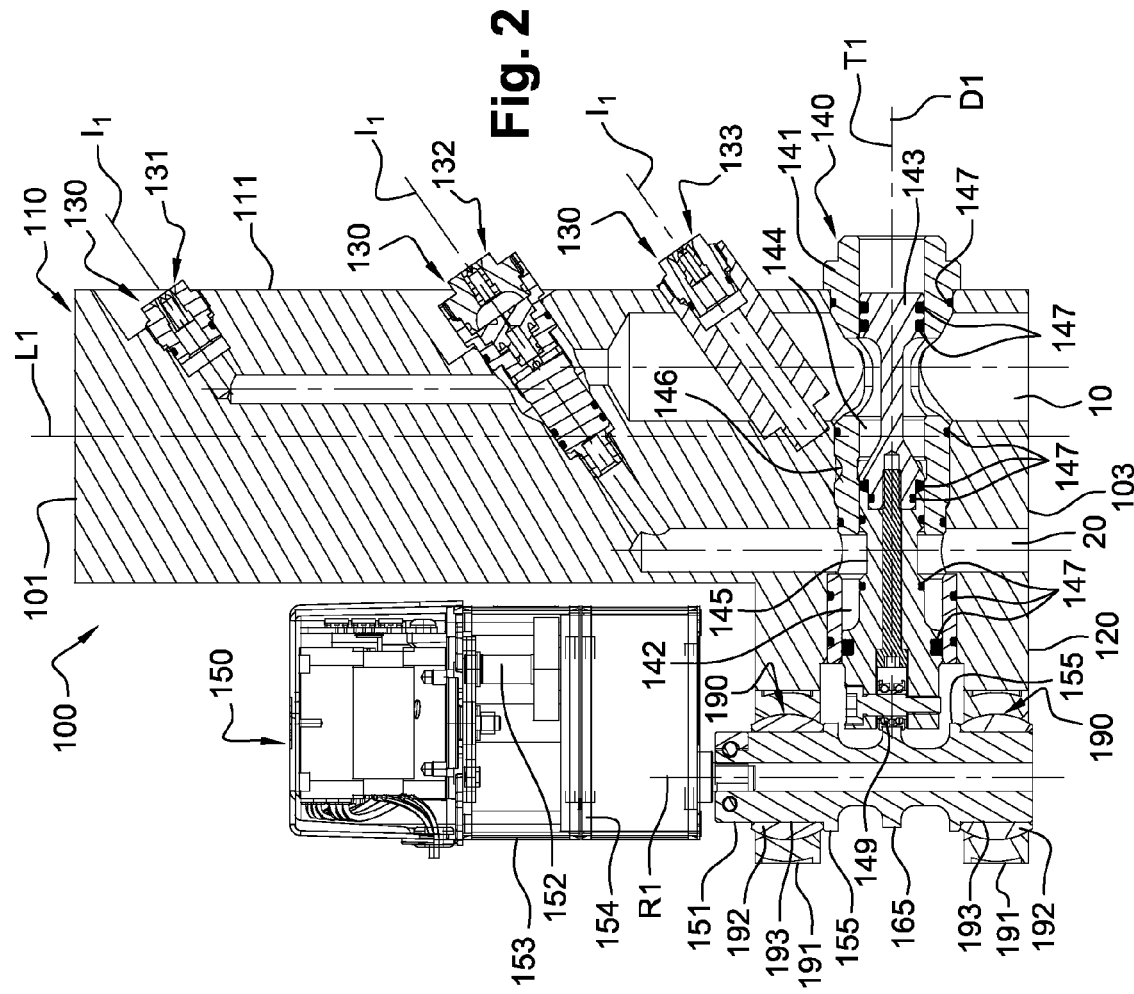
FIG. 2 is a schematic sectional view of the device of FIG. 1 according to the plane A1-A1.

Hence, these devices 100; 200 overhang the ski slope by about ten meters and are hereinafter referred to as "snowing head".

This snowing machinery is supplied with pressurised water and with pressurised air via supply lines (not shown) extending in particular along the slope. These supply lines include pipes (not shown) allowing the transportation of pressurised air and pressurised water up to each snowing machinery for the supply of pressurised water or of pressurised air to the associated snowing head 100; 200.

These water and air supply lines also includes general closing valves (not shown), arranged generally at the base of each pole, allowing to close or to open the supply of pressurised air and pressurised water, respectively, to a pressurised water supply duct 10 and a pressurised air supply duct 20 provided in a body 101; 201 of the snowing head 100; 200.

The pressurised water and the pressurised air are conveyed conventionally, via suitable pipes within the pole, from the general closing valves to the pressurised water and pressurised air supply ducts 10, 20 of the body 101; 201 of the snowing head 100; 200.

In each of the embodiments of the invention shown in FIGS. 1 to 21, the body 101; 201 of the snowing head 100; 200 has herein a generally "L-shaped" profile section that defines, on the one hand, an upper branch 110; 210 that extends along a longitudinal axis L1; L2, advantageously vertical or at least approximately vertical once in position on the pole, and on the other hand, a lower branch 120; 220 that extends along a transverse axis T1; T2, perpendicular to the longitudinal axis L1, L2 and advantageously horizontal or at least approximately horizontal (FIGS. 2 and 11).

Each body 101; 201 comprise spray elements 130; 230 adapted to spray water or a mixture of air and water.

These spray elements 130; 230 are herein composed—of water spray nozzles 131, 133; 231, 233, 234, 235 spraying pressurised water, and—at least one nucleation device 132; 232, spraying a mixture of pressurised water and air.

As detailed hereinafter, some of these water spray nozzles 133; 233, 234, 235 may be drained by pressurised air.

These spray elements 130; 230 each have a section whose profile is substantially circular, and each extending herein along an axis I1; I2 that is upwardly inclined with respect to the transverse axis T1; T2 of the lower branch 120; 220.

The inclined axes I1; I2 herein form an angle with the transverse axis T1; T2 comprised between 30 degrees and 45 degrees, preferably herein equal to 35 degrees.

The spray elements 130; 230 are herein arranged in cavities provided for that purpose in the upper branch 110; 210 of the body 101; 201.

These spray elements 130; 230 are herein arranged on a same front face 111; 211 of the upper branch 110; 210. This front face 111; 211 is herein opposed to the lower branch 120; 220 of the body 101; 201.

Hence, these spray elements 130; 230 each have a free end through which is propelled pressurised water for the water spray nozzles 131, 133; 233, 234, 235, or a mixture of pressurised water and air for the nucleation devices 132; 232.

On the side opposite to this free end, these spray elements 130; 230 are connected either only to the pressurised water duct 10, or to the pressurised water and pressurised air ducts 10 and 20.

The pressurised water and pressurised air supply ducts 10, 20 each extend along a axis parallel to the longitudinal axis L1; L2, so as, on the one hand, to supply the spray elements 130; 230, and on the other hand, to be connected to the pole by a lower face 103; 203 of the body 101; 201.

The body 101; 201 of the snowing head 100; 200 moreover comprises at least one control valve 140; 240 for the adjustment of the supply of pressurised water or of pressurised air to at least one water spray nozzle 133; 233, 234, 235 equipping the spray elements 130; 230.

These control valves 140; 240 herein consist in generally cylindrical slide valves.

They are, on the one hand, arranged in the lower branch 120; 220 so that they pass through the lower branch 120; 220 along the transverse axis T1; T2, and on the other hand, connected separately to each of the pressurised water and pressurised air supply ducts 10, 20.

Each control valve 140; 240 more particularly comprises a fixed body 141; 241, generally tubular in shape, delimiting an inner housing 142; 242 in which is accommodated a mobile body 143; 243.

The mobile body 143; 243 can be translationally operated, with respect to the fixed body 141; 241, along a translation axis D1; D2 extending parallel to the transverse axis T1; T2 of the lower branch 120; 220 of the body 101; 201 of the device 100; 200.

The fixed body 141; 241 of each control valve 140; 240 is herein fixed to the body 101; 201 of the snowing head 100; 200 by suitable fixation means (not shown).

This control valve 140; 240 comprises over a part of its perimeter at least one water chamber 144; 244 intended to be supplied with pressurised water via the pressurised water supply duct 10, and at least one air chamber 145; 245 intended to be supplied with pressurised air via the pressurised air supply duct 20.

These water 144; 244 and air 145; 245 chambers are delimited between the mobile body 143; 243 and the fixed body 141; 241.

They are herein permanently subjected to pressurised water and to pressurised air, respectively, as soon as the general closing valves allow it.

The water chamber 144; 244 is adapted to supply a supply opening 146; 246 formed through the fixed body 141; 241, as a function of the position of the mobile body 143; 243 with respect to the fixed body 141; 241 of the control valve 140; 240.

Hence, the mobile body 143; 243 is mobile between at least two positions with respect to the fixed body 141; 241 of the control valve 140; 240, i.e.:
- a first position allowing the supply of pressurised water to the corresponding spray nozzle 133; 233, 234, 235, called "position allowing water", and
- a second position inhibiting the supply of pressurised water to the corresponding spray nozzle 133; 233, 234, 235, called "position inhibiting water".

The air chamber 145; 245 is also adapted to supply the supply opening 146; 246 formed in the fixed body 141; 241, as a function of the position of the mobile body 143; 243 with respect to the fixed body 141; 241 of the control valve 140; 240.

Hence, the mobile body 143; 243 is mobile in translation, between at least two other positions with respect to the fixed body 141 of the control valve 140; 240, i.e.:
- a third position allowing the supply of pressurised air to the corresponding spray nozzle 133; 233, 234, 235, called "position allowing air", and a fourth position inhibiting the supply of pressurised air to the corresponding spray nozzle 133; 233, 234, 235, called "position inhibiting air".

These water 144; 244 and air 145; 245 chambers each have herein the shape of a groove formed in the mobile body 143; 243, extending about the translation axis D1; D2.

These water 144; 244 and air 145; 245 chambers are moreover distributed over the length of said mobile body 143; 243: the water chamber 144; 244 is provided on the side of an end of the mobile body 143; 243, and the air chamber 145; 245 is provided on the side of another end of the mobile body 143; 243.

Each control valve 140; 240 herein comprises sealing elements 147; 247 (see FIGS. 2 and 11) to ensure the sealing, on the one hand, between the body 101; 201 of the snowing head 100; 200, and the fixed body 141; 241, and on the other hand, between the fixed body 141; 241 and the mobile body 143; 243 of the control valve 140; 240.

These sealing elements 147; 247 herein consist in 0-rings of circular or rectangular section, but other types of gaskets could be contemplated.

The snowing head 100; 200 further comprises piloting means 150; 250 intended to operate the control valve(s) 140; 240 so as to allow/inhibit the supply of pressurised air or of pressurised water to the corresponding spray nozzle 133; 233, 234, 235.

More particularly, the piloting means 150; 250 are adapted to displace the mobile body 143; 243 in the fixed body 141. 241 of the control valve 140; 240, according to a translational displacement.

As can be seen in FIGS. 2 and 11, the piloting means 150; 250 comprise a camshaft 151; 251 driven into rotation about its longitudinal axis R1, R2 by an actuator 153; 253.

This camshaft 151; 251 includes a cylindrical axis over the length of which are added one or several elements forming cams 160; 260, 270, 280. Each control valve 140; 240, in particular the mobile body 143; 243 thereof, cooperates with the cam 160 or one of the cams 260, 270, 280 carried by the camshaft 151; 251.

The axis of rotation R1; R2 herein consists in an axis extending parallel, or at least approximately parallel, to the longitudinal axis L1; L2.

Figure 3:
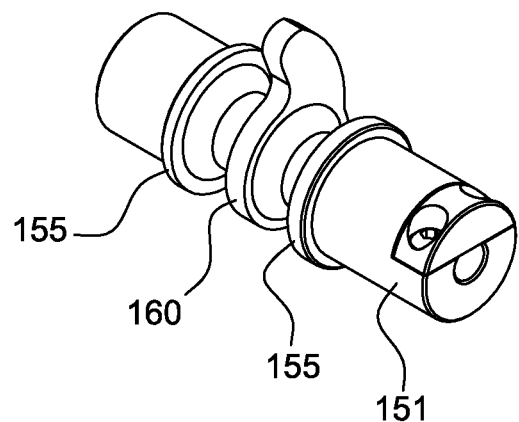
FIG. 3 shows the camshaft equipping the device of FIGS. 1 and 2, in a schematic and perspective view.

As shown more particularly in FIGS. 3 and 12, each cam 160; 260, 270, 280 has a particular profile (or outline) that is intended to cooperate with a free end 149; 249 of the mobile body 143; 243.

In this respect, each cam 160; 260, 270, 280 extends in a plane passing, at least approximately, by the translation axis D1; D2 of the associated control valve 140; 240.

Hence, as developed hereinafter, the cam(s) 160; 260, 270, 280 carried by the camshaft 151; 251 are rotationally piloted for the operation of the associated control valve(s) 140; 240.

The actuator 153; 253 is of the gear reducer type, comprising an electric motor 153; 253 that drives into rotation a rotor 152; 252. This rotor 152; 252 drives a reducer 154; 254 that itself drives into rotation the camshaft 151; 251 about its axis of rotation R1; R2.

The electric motor 153; 253 is herein a bidirectional motor, to allow the rotation of the camshaft 151; 251 in a first direction of rotation S1 and in a second direction of rotation S2, opposite to each other, about the axis of rotation R1, R2.

The piloting means 150; 250 herein comprise means for controlling the speed and controlling the position of the rotational movement of the camshaft 151; 251, associated with the motor 153; 253.

These speed and position control means are adapted to control precisely the angular position of the camshaft 151; 251 and hence the translational position of the mobile body 143; 243 of the control valve 140; 240.

Besides, the body 101; 201 of the snowing head 100; 200 comprises return means 145; 245 that ensure the holding of each control valve 140; 240 in a position in which their free end 149; 249 bears against the opposite cam 160; 260, 270, 280.

The air chamber 145; 245 has such a form that it herein constitutes the return means 145; 245, as far as it is subjected to pressurised air coming from the pressurised air supply duct 20. The configuration of this air chamber 145; 245 is such that, in the presence of pressurised air, this air herein pushes permanently the mobile body 143; 243 of the control valve 140; 240 against the opposite cam 160; 260, 270, 280.

The pressurised air is herein that of the pressurised air supply duct 20 used to supply a nucleation device 132, 232 (corresponding to a pressurised air/water spray nozzle, well known by the one skilled in the art, for the formation of micro-balls of ice intended to favour the production of ice crystals by the associated water spray nozzles).

As a variant, it could be contemplated return means formed by air specifically dedicated to this function, by pressurised water circulating in the pressurised water supply duct, or by mechanical return means formed by a spring, for example a compression spring.

The pressure of water is herein comprised between 12 bar and 100 bar and the pressure of air is herein comprised between 2 bar and 10 bar.

According to the first embodiment shown in FIGS. 1 to 9, the body 101 of the snowing head 100 comprises three spraying elements 130.

Figure 1:
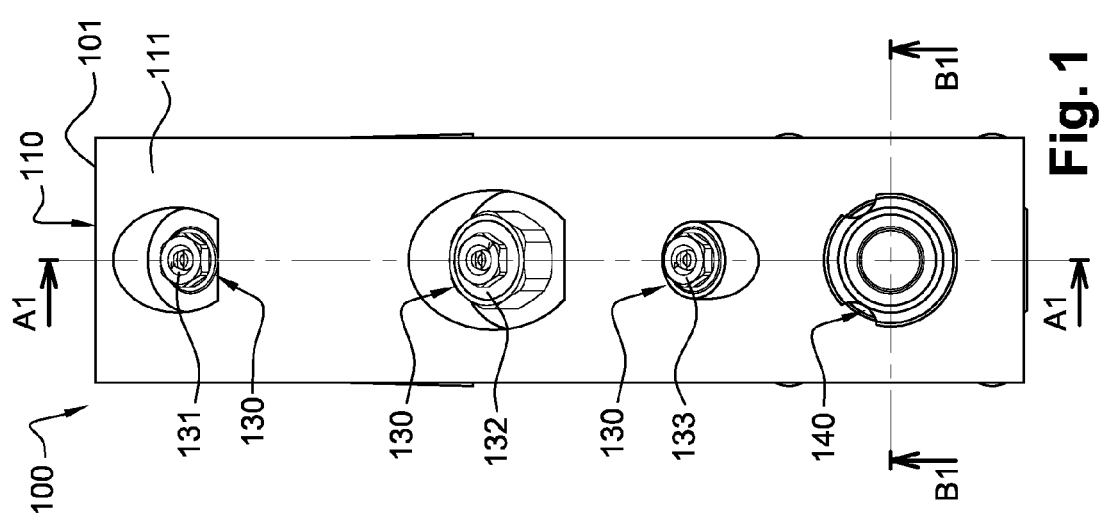
FIG. 1 is a schematic front view of a first embodiment of a culture snow making device according to the invention.

These spray elements 130 are arranged in such a manner that, in the body 101 of the device 100, each inclined axis 11 is comprised in the plane A1-A1 of FIG. 1.

One of the spray elements 130 is formed by a first spray nozzle 131 arranged near the free end of the upper branch 110. This first spray nozzle 131 is intended to spray pressurised water to make culture snow.

Another of the spray elements 130 is formed by a nucleation device 132 arranged substantially at the middle of the upper branch 120 of the body 101 of the snowing head 100. It is herein intended to spray a mixture of pressurised air and water.

The first water spray nozzle 131 and the nucleation device 132 are herein each supplied directly. In other words, they have no piloting of their supply of pressurised water and pressurised air by a control valve 140 as mentioned above.

A last spray element 130 is formed by a second water spray nozzle 133 and whose supply is controlled by a control valve 140 as described hereinabove.

Figure 4:
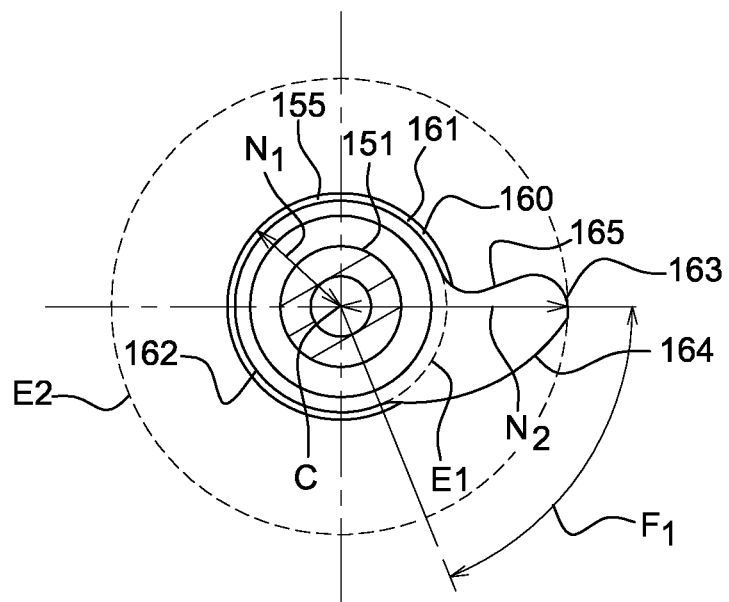
FIG. 4 is a schematic sectional view of the camshaft of FIG. 3, showing the profile of its cam.

As shown more particularly in FIGS. 2 and 4, the camshaft 151 comprises a single cam 160 to allow the translational displacement of the mobile body 143 of the associated control valve 140.

In FIG. 4, the cam 160 mounted on the camshaft 151 is shown in profile.

The cam 160 has herein a particular outline 161 that cooperates at least in part with the free end 149 of the mobile body 143 of the control valve 140 to displace it in translation in a fine and precise manner, along the translation axis D1.

More particularly, the cam 160 has two virtual circles E1, E2, of same centre C located on the axis of rotation R1 of the camshaft 151, represented by a dotted line in FIG. 4, between which is inscribed the outline 161 of the cam 160.

A small circle E1 has a radius N1 lower than the radius N2 of the great circle E2.

A first portion 162 of the outline 161, generally circular in shape, is located on the small circle E1; and a second portion 163 of the outline 161 is located on the great circle E2.

In this case, when the free end 149 of the mobile body 143 of the control valve 140 is in contact with the first portion 162, the second spray nozzle 133 is supplied with pressurised water with a maximum flow rate, called "maximum flow rate portion 162" (see FIG. 9), whereas when the free end 149 of the mobile body 143 of the control valve 140 is in contact with the second portion 163, the second spray nozzle 133 sprays neither pressurised water nor pressurised air (see FIG. 5), called "rest portion 163".

The maximum flow rate portion 162 of the outline 161 of the cam 160 herein extends over an angle of about 270 degrees. The rest portion 163 of the outline 161 of the cam 160 herein extends over an angle of a few degrees, herein this angle is lower than 20 degrees.

These maximum flow rate portion 162 and rest portion 163 of the outline 161 of the cam 160 are connected, on one side, by a third portion 164 of outline 161, called "transition portion 164", arranged in such a manner that it allows a translational displacement of the free end 149 of the mobile body 143 of the control valve 140, and on another side, by a fourth portion 165 of outline 161, called "stop portion 165", which forms the stop means 165 for the free end 149 of the mobile body 143 of the control valve 140.

More particularly, the transition portion 164 is adapted to displace in translation the free end 149 of the mobile body 143 of the control valve 140 over a distance equal to the difference between the values of the first and second radii N1, N2.

The transition portion 164 has herein a convex curved shape.

During the translational displacement, it is provided to perform a draining of water by pressurised air to allow the evacuation of the water droplets still present in the second spray nozzle 133.

The above-mentioned distance is herein advantageously comprised between 10 millimeters and 20 millimeters.

The first radius N1 is herein advantageously comprised between 10 millimeters and 20 millimeters, whereas the second radius N2 is herein advantageously comprised between 20 millimeters and 40 millimeters.

This transition portion 164 of the outline 161 of the cam 160 extends over an angle F1 herein equal to 68 degrees (see FIG. 4), but it could be contemplated that it extends over a different angle, for example a greater angle or a smaller angle as a function in particular of the camshaft rotation speed control means and position control means.

The stop portion 165 herein has at least one tangent passing through the centre C so as to lock the rotation of the camshaft 151; 251 in one of the directions of rotation S1, S2.

As a conclusion, when the free end 149 of the mobile body 143 of the control valve 140 is in contact with the maximum flow rate portion 162 of the outline 161 of the cam 160, the control valve 140 is in a position allowing the pressurised water and inhibiting the pressurised air (see FIG. 9);

when the free end 149 of the mobile body 143 of the control valve 140 is in contact with the transition portion 164 of the outline 161 of the cam 160, the control valve 140 performs the draining of the second spray nozzle 133 by pressurised air before allowing or inhibiting the supply of pressurised water to this second spray nozzle 133 (see FIGS. 6, 7 and 8); and when the free end 149 of the mobile body 143 of the control valve 140 is in contact with the rest portion 163 of the outline 161 of the cam 160, the control valve 140 is in a position inhibiting the pressurised water and the pressurised air; and the second spray nozzle 133 has no water droplets thanks to the draining by air (see FIG. 5).

In FIGS. 6, 8 and 9, the path of the pressurised water or of the pressurised air through the second spray nozzle 133 is represented by arrows 11, 21, respectively.

In FIGS. 5 and 6, two different angular positions of the camshaft 151 are shown. From FIG. 5 to FIG. 6, the camshaft 151 has been displaced in the second direction of rotation S2 by an angle of 16 degrees, which represents herein a translational displacement of 3 millimeters of the free end 149 of the mobile body 143 of the control valve 140, corresponding to an opening of the supply of pressurised air to the second spray nozzle 133.

In FIGS. 5 and 7, two different angular positions of the camshaft 151 are shown. From FIG. 5 to FIG. 7, the camshaft 151 has been displaced in the second direction of rotation S2 by an angle of 29 degrees, which represents herein a translational displacement of 7 millimeters of the free end 149 of the mobile body 143 of the control valve 140, herein corresponding to a closing of the supply of pressurised air to the second spray nozzle 133.

In FIGS. 5 and 8, two different angular positions of the camshaft 151 are shown. From FIG. 5 to FIG. 8, the camshaft 151 has been displaced in the second direction of rotation S2 by an angle of 44 degrees, which represents herein a translational displacement of 11 millimeters of the free end 149 of the mobile body 143 of the control valve 140, herein corresponding to an opening of the supply of pressurised water to the second spray nozzle 133.

In FIGS. 5 and 9, two different angular positions of the camshaft 151 are shown. From FIG. 5 to FIG. 9, the camshaft 151 has been displaced in the second direction of rotation S2 by an angle of 68 degrees, which represents herein a translational displacement of 16 millimeters of the free end 149 of the mobile body 143 of the control valve 140, herein corresponding to a full opening of the supply of pressurised water to the second spray nozzle 133.

According to a variant of the embodiment shown in FIGS. 1 to 9, it could be contemplated that the actuator has no speed and position control means.

In practice, to implement such a snowing head 100, an operating method is used, which allows in particular to ensure the evacuation of the water droplets from the second spray nozzle 133 after having inhibit the supply of pressurised water to this second spray nozzle 133 (see FIG. 9), via the draining by pressurised air.

Hence, the operating method will be herein described in more details according to the first direction of rotation S1, i.e. from a state corresponding to a full opening of the supply of pressurised water to the second spray nozzle 133 (see FIG. 9), to a state in which the second spray nozzle 133 has been drained from water by pressurised air and is supplied neither with pressurised water nor with pressurised air (see FIG. 5).

The operating method comprises the following steps, piloted automatically by the means for controlling the speed and for controlling the position of the rotational movement:

a) piloting the camshaft 151 to operate the control valve 140 to a configuration allowing the supply of pressurised water to the second water spray nozzle 133 (see FIG. 9), b) piloting the camshaft 151 in the first direction of rotation S1 to operate the control valve 140 to a configuration inhibiting the supply of pressurised water to the second spray nozzle 133 (see FIGS. 8 and 7), c) piloting the camshaft 151 in the first direction of rotation S1 to operate the control valve 140 to a configuration allowing the supply of pressurised air to the second spray nozzle 133, so as to ensure the evacuation of water from the second spray nozzle 133 (see FIGS. 7 and 6) by a draining by pressurised air, then d) piloting the camshaft 151 in said first direction of rotation S1 to operate the control valve 140 to a configuration inhibiting the supply of pressurised air to the second spray nozzle 133 (see FIGS. 6 and 5).

In other terms, these steps a), b), c) and d) herein correspond to a displacement of the free end 149 of the mobile body 143 of the control valve 140 on the transition portion 164 of the outline 161 of the cam 160 in the first direction of rotation S1.

To supply again pressurised water to the second spray nozzle 133, the camshaft 151 in piloted in the second direction of rotation S2 so as to perform the steps d), c), b) and a) (see FIGS. 5 to 9).

The second embodiment of a device according to the invention is illustrated in particular in FIGS. 10 to 21.

According to this second embodiment, the body 201 of the device 200 comprises eleven spray elements 230.

Similarly to the first embodiment shown in FIGS. 1 to 9, the body 201 of the snowing head 200 comprises, on the one hand, three nucleation devices 232 identical or similar to those described above, and on the other hand, eight spray nozzles 231, 233, 234, 235.

The spray nozzles 231, 233, 234, 235 are distributed by pairs, in the upper branch 210 of the body 201, and symmetrically with respect to the plane A2-A2, in four different levels of the pressurised water and pressurised air ducts 10, 20.

Two spray nozzles 231, the closest from the free upper end of the upper branch 210, are each supplied directly with pressurised water.

The other spray nozzles 233, 234, 235 of a same level are supplied with pressurised water through a same control valve 240.

The different control valves 240 are also each arranged at different levels of the pressurised water and pressurised air ducts 10, 20.

These control valves 240 being similar to those described hereinabove in the first embodiment shown in FIGS. 1 to 9, they won't be described in detail herein.

As shown in FIGS. 11 and 12, these control valves 240 are piloted by a same camshaft 251 that is operated into rotation by a single actuator 253 as described hereinabove within the framework of the first embodiment.

Herein, the camshaft 251 is equipped with several cams 260, 270, 280, distributed over its height, each intended to pilot one of the control valves 240.

These cams 260, 270, 280 each have a particular outline 261, 271, 281, which advantageously depends on the number of cams arranged on the camshaft 251 and also on the desired sequence of supply of pressurised air or water to the water spray nozzles 233, 234, 235.

The profile of these three cams 260, 270, 280 is herein such that, for at least one position of the camshaft 251, the control valves 240 associated with the water spray nozzles 233, 234, 235 are intended to be in positions for allowing/inhibiting the supply of pressurised water or pressurised air that are different for each of the associated spray nozzles 233, 234, 235, as shown in FIGS. 18 to 21.

Hence, the profile of each cam 260, 270, 280 is adapted to make a particular sequence (or particular kinematics) allowing to control the quantity of pressurised water supplied to each of the spray nozzles 233, 234, 235 and hence the production of culture snow.

In FIGS. 13 to 17, the snowing head 200 of FIG. 10 is shown in a sectional view according to the plane B2-B2, in which the cam 260 and the associated control valve 240 are, respectively, in different angular positions and translation positions.

The positions of the free end 249 of the mobile body 243 of the control valve 240 shown in FIGS. 13 to 17 are herein identical to those of the free end 149 of the mobile body 143 of the control valve 240 respectively shown in FIGS. 5 to 9.

Herein, only the outline 261 and the angular positions of the cam 260 shown in FIGS. 13 to 17 are different.

Hence, the angular position of the cam 260 of FIG. 13 corresponds to 0 degree, that of FIG. 14 corresponds to 220 degrees, that of FIG. 15 corresponds to 233 degrees, that of FIG. 16 corresponds to 248 degrees and that of FIG. 17 corresponds to 272 degrees.

As shown more particularly in FIGS. 18 to 21, each cam 260, 270, 280 herein comprises, at least on its outline 261, 271, 281, the following portions:

the maximum flow rate portion 262, 272, 282,
the rest portion 263, 273, 283,
the transition portion 264, 274, 284 and
the stop portion 265, 275, 285.

The three cams 260, 270, 280 shown herein may be in six different combinations of production of culture snow, in which the spray nozzles 233, 234, 235—either spray pressurised water at a maximum flow rate,—or are not supplied with pressurised water.

These combinations are herein each represented by angular segments G1, G2, G3, G4, G5, G6 passing through the rotation axis R2 of the camshaft 251 and angularly separated two by two by 68 degrees (except for the passage from the segment G6 to the segment G1).

More particularly, the rotation of the camshaft 251 allows to bring, successively and independently, each of the angular segments G1, G2, G3, G4, G5, G6 opposite the control valves 240, wherein:

in G1, only the spray nozzles 231 supplied directly spray pressurised water (the spray nozzles 233, 234, 235 are not supplied with pressurised water);

in G2, two pairs of spray nozzles 231, 233 spray pressurised water;

in G3, two other pairs of spray nozzles 231, 234 spray pressurised water;

in G4, the spray nozzles 231, 233, 234 spray pressurised water;

in G5, the spray nozzles 231, 234, 235 spray pressurised water; and in G6, all the spray nozzles 231, 233, 234, 235 spray pressurised water.

In practice, to implement such a snowing head 200, an operating method similar to that described hereinabove for the snowing head shown in FIGS. 1 to 9 is used.

It is only necessary to pilot the rotation of the camshaft 251 in one of the two directions of rotation S1, S2 to allow the adjustment of the number of spray nozzles 233, 234, 235 to be supplied with pressurised water so as to produce the desired quantity of culture snow.

In FIGS. 22 and 23, two other camshafts 351; 451 for snowing heads according to the invention are shown.

These camshafts 351; 451, similar to those described hereinabove, are different from these latter in the number of cams they comprise.

In FIG. 22, the camshaft 351 comprises only two cams 360, 370 having herein a particular profile allowing a particular sequence of piloting of the pressurised water supply of the control valves (not shown).

Figure 24:
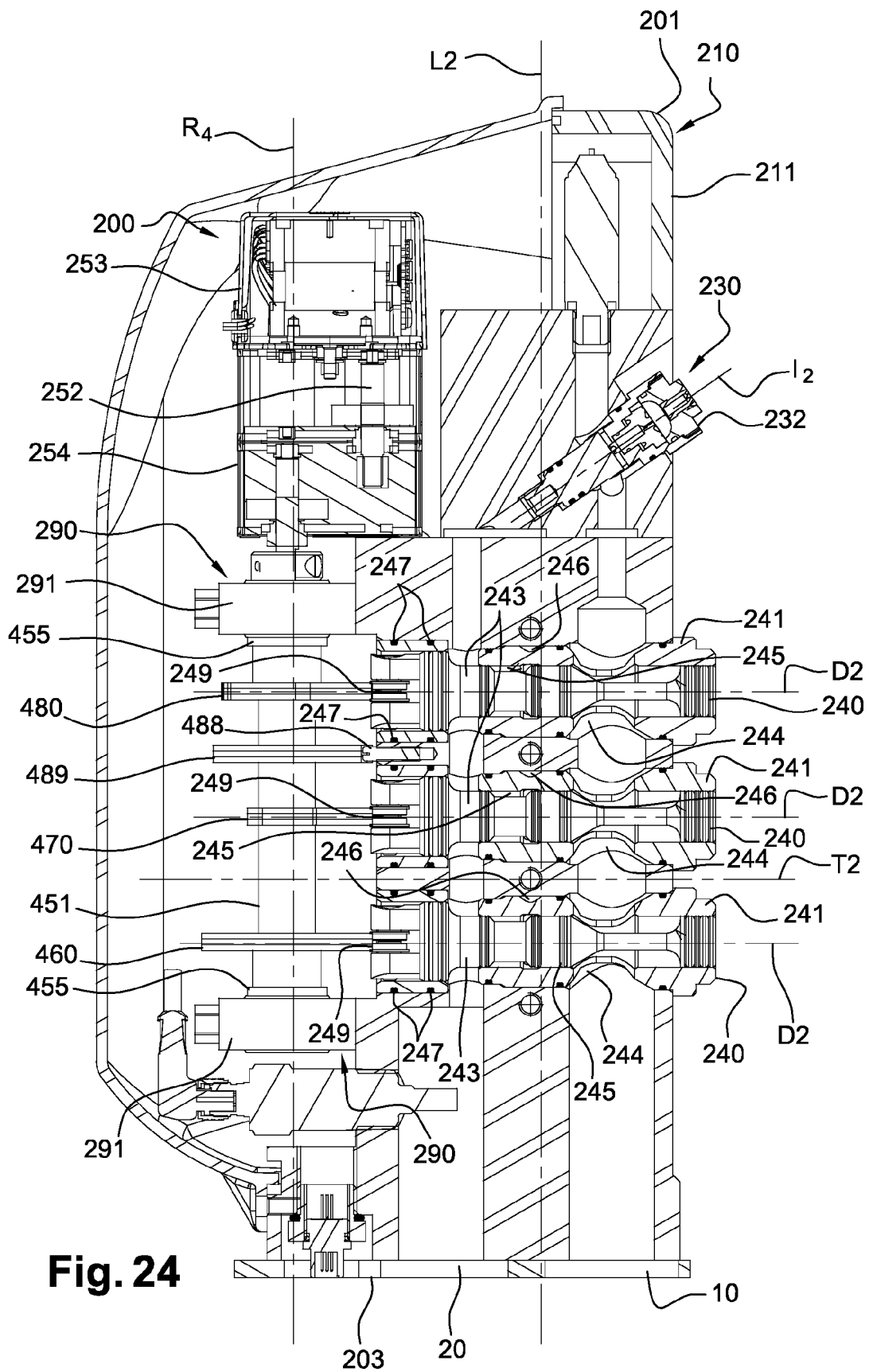

The camshaft 451 shown in FIG. 23 is similar to that shown in FIG. 12, in particular due to the fact that it includes three cams 460, 470, 480 for piloting at least three control valves 240 (see FIG. 24).

It is different therefrom only in that is includes also a stop cam 489, herein consisting in a disc provided with a radial pin on its periphery.

The device receiving such a camshaft 451, shown in FIG. 24, is similar to that described hereinabove in relation with FIG. 11. By way of simplification, the numerical references used for the description of FIG. 11 will be kept herein to denote the identical or similar structural elements.

In particular, as shown in FIG. 24, the rear face of the lower branch 220 of its body 201, opposed to the front face 211 and intended to come opposite the camshaft 451, comprises a fixed stop element 488.

This stop element 488 extends in protrusion from this rear face, opposite the above-mentioned stop cam 489.

This stop cam 489 has a profile that allows to make a mechanical rotation stop for the camshaft 451, against the fixed stop element 488, hence defining the rotation limit positions.

This fixed stop element 488 herein consists in a screw arranged in the lower branch 220 of the body 201.

As can be seen in FIGS. 3, 12, 22 and 23, the camshafts 151, 251, 351, 451 each include translation locking means 155; 255; 355; 455 along their respective axis of rotation R1; R2; R3; R4.

These locking means 155; 255; 355; 455 are herein formed of two discs 155; 255; 355; 455 that each have an outer diameter greater than the diameter of the camshaft 151; 251; 351; 451, and that extend about the axis of rotation R1; R2; R3; R4 of the camshaft 151; 251; 351; 451.

Between these two discs 155; 255; 355; 455 of a same camshaft 151, 251, 351, 451 are respectively arranged the cam(s) 160; 260, 270, 280; 360, 370; 460, 470, 480, 489 described above.

As shown more particularly in FIGS. 2, 11 and 24, the body 101; 201 of the snowing head 100; 200 comprises means 190; 290 for holding the piloting means 150; 250.

These holding means 190; 290 are arranged on a rear face 112; 212 of the lower branch 120; 220 of the body 101; 201, opposed to the front face 111; 211.

They have herein two arms 191, 291 that extend from this rear face 112; 212 along axes parallel to the translation axis D1, D2.

As shown more particularly in FIGS. 2 and 11, these arms 191; 291 each include a receiving opening 192; 292 that opens on either side of each of the arms 191; 291, and that extends about the axis of rotation R1, R2 of the camshaft 151; 251.

In each of these receiving openings 192; 292 is provided a rolling bearing 193; 293 herein adapted to leave the camshaft 151; 251 free in rotation with respect to the body 101; 201 of the snowing head 100; 200, about its axis of rotation R1; R2.

These rolling bearings 193; 293 also form herein stops cooperating with the discs 155; 255 of the camshaft, to lock the camshaft 151; 251 in translation, along the axis of rotation R1; R2.

The present invention is not limited to the embodiments described and shown, and the one skilled in the art will be able to add any variant in accordance with the scope thereof.

It could be contemplated a unidirectional motor and a cam with no stop portion or no stop cam.

It could also be contemplated a cam displacing in translation at least one control valve to control the supply of pressurised air and/or pressurised water to at least one spray nozzle, or to a nucleation device.

According to an alternative embodiment not shown, it could also be contemplated, on the one hand, control valves arranged near the end of the pole that is fixed in the ground, and on the other hand, that these control valves are each piloted at least by a cam arranged on a camshaft driven into rotation by an actuator.

Moreover, it could be contemplated that the same cam pilots two different control valves.

It hence obtained a culture snow making device that is of simple structure and that allows to pilot very finely and very precisely the control valve(s) of one or several spray nozzles.

It may also be easily obtained different combinations of operation of a plurality of spray nozzles.

The invention claimed is:

1. A culture snow making device, comprising a body including:
   a pressurised water supply duct,
   a pressurised air supply duct,
   at least one spray element for spraying water or a mixture of air and water,
   at least one control valve adjusting the supply of pressurised water and/or pressurised air to said at least one spray element, and
   piloting means intended to pilot said at least one control valve, the piloting means comprising a camshaft driven into rotation about a longitudinal axis thereof by an actuator,
   said at least one control valve cooperating with a cam carried by said camshaft,
   wherein said at least one control valve is placed on said pressurised water supply duct and on said pressurised air supply duct, and includes, over a perimeter part, at least one water chamber intended to be supplied with pressurised water via said pressurised water supply duct, and, at least one air chamber intended to be supplied with pressurised air via said pressurised air supply duct, said at least one control valve comprising a fixed body, generally tubular in shape, delimiting an inner housing accommodating a mobile body, translationally mobile along a translation axis extending perpendicular with respect to said longitudinal axis of said camshaft.

2. The device according to claim 1, wherein,
   said body comprises at least two of said cam arranged on the camshaft of said piloting means,
   said body comprises at least two of said at least one control valve that are each arranged at different levels of said pressurised air supply duct and said pressurised water supply duct and,
   each of the at least two control valves is piloted by a respective one of the at least two cams arranged on the camshaft of said piloting means.

3. The device according to claim 1, wherein said at least one spray element is in the form of a nucleation device supplied with pressurised water via said pressurised water supply duct and supplied with pressurised air via said pressurised air supply duct.

4. The device according to claim 2, wherein said at least one spray element is in the form of a nucleation device supplied with pressurised water via said pressurised water supply duct and supplied with pressurised air via said pressurised air supply duct.

5. The device according to claim 1, wherein said at least one spray element is in the form of a water spray nozzle.

6. The device according to claim 2, wherein said at least one spray element is in the form of a water spray nozzle.

7. The device according to claim 3 wherein said at least one spray element is in the form of a water spray nozzle.

8. The device according to claim 1, wherein said at least one spray element includes:
- a first spray element in the form of a water spray nozzle, and
- a second spray element in the form of a nucleation device,
- the nucleation device being arranged downstream of said water spray nozzle, with respect to said pressurised water supply duct, and at least said water spray nozzle being supplied with water or air through said at least one control valve.

9. The device according to claim 2, wherein said at least one spray element includes:
- a first spray element in the form of a water spray nozzle, and
- a second spray element in the form of a nucleation device,
- the nucleation device being arranged downstream of said water spray nozzle, with respect to said pressurised water supply duct, and at least said water spray nozzle being supplied with water or air through said at least one control valve.

10. The device according to claim 1, wherein the cam has such a profile that the at least one control valve is mobile between at least two positions:
- a position allowing the supply of pressurised water and possibly of pressurised air to said at least one spray element, and
- a position inhibiting the supply of pressurised water and possibly of pressurised air to said at least one spray element.

11. The device according to claim 10, wherein said at least one spray element comprises at least one water spray nozzle, the first and second positions allowing and inhibiting respectively the supply of pressurised water to said at least one water spray nozzle, and wherein said cam has such a profile that said at least one control valve is mobile up to a third position, different from said first and second positions, allowing the supply of pressurised air to said at least one water spray nozzle.

12. The device according to claim 2, wherein the profile of the at least two cams is such that the at least two control valves are adapted, for a same position of the camshaft, to be in positions that are different from each other.

13. The device according to claim 1, wherein said at least one control valve is adapted to allow a draining of water from said at least one of the water spray element by pressurised air coming from said pressurised air supply duct.

14. The device according to claim 1, wherein each of the at least one control valve has a free end, and further comprising means for returning the free end of each of the at least one control valve to a position opposite to said cam.

15. The device according to claim 14, wherein the return means are formed by the pressurised air circulating in said pressurised air supply duct.

16. The device according to claim 1, wherein the actuator comprises a bidirectional motor (153; 253) that drives said camshaft into rotation, the motor being associated with means for controlling the speed and controlling the position of the camshaft.

17. An operating method of a machinery equipped with said device according to claim 1, with the at least one spray element comprising a water spray nozzle, said operating method comprising the following steps:
- a) piloting said camshaft to allow the supply of pressurized water to said water spray nozzle via said associated at least one control valve,
- b) piloting said camshaft in a first direction of rotation to inhibit the supply of pressurized water to said water spray nozzle,
- c) piloting said camshaft in said first direction of rotation to allow the supply of pressurized air to said water spray nozzle, so as to ensure the evacuation of the pressurized water from said water spray nozzle, then
- d) piloting said camshaft in said first direction of rotation to inhibit the supply of pressurised air to said water spray nozzle.

18. The operating method according to claim 17, that comprises the additional step of
- e) piloting said camshaft in a second direction of rotation, opposite to said first direction of rotation, so as to perform the successive steps d), c), b) then a).

* * * * *